(12) United States Patent
Kurokawa et al.

(10) Patent No.: US 6,516,915 B2
(45) Date of Patent: Feb. 11, 2003

(54) ELECTRIC POWER STEERING DEVICE

(75) Inventors: Takanori Kurokawa, Yamatokooriyama (JP); Hirokazu Arai, Yamatokooriyama (JP)

(73) Assignee: Koyo Seiko Co., Ltd, Osaka (JP)

(*) Notice: Subject to any disclaimer, the term of this patent is extended or adjusted under 35 U.S.C. 154(b) by 0 days.

(21) Appl. No.: 09/746,642

(22) Filed: Dec. 22, 2000

(65) Prior Publication Data

US 2002/0046897 A1 Apr. 25, 2002

(30) Foreign Application Priority Data

Sep. 7, 2000 (JP) .......................... 2000-271302

(51) Int. Cl.$^7$ .............................................. F16H 55/48
(52) U.S. Cl. ....................... 180/444; 74/388 PS; 74/425
(58) Field of Search .............................. 180/444, 443, 180/400, 412, 413; 74/724, 388 PS, 458, 425

(56) References Cited

U.S. PATENT DOCUMENTS 5,482,128 A * 1/1996 Takaoka et al. ............. 180/444
5,722,295 A * 3/1998 Sakai et al. .................. 264/101
5,954,178 A * 9/1999 Fischer et al. ............. 192/84.6

FOREIGN PATENT DOCUMENTS

JP         2000130564 A  *  5/2000  ........... F16H/55/48

OTHER PUBLICATIONS

ASTM Designation: D789–98, "Standard Test Methods for Determination of Relative Viscosity and Moisture Content of Polyamide (PA)", Jan. 1999.*

* cited by examiner

Primary Examiner—F. Zeender
(74) Attorney, Agent, or Firm—Jordan and Hamburg LLP

(57) ABSTRACT

In an electric power steering device, the rotation of an electric actuator for generating auxiliary steering power is transmitted to a vehicle wheel by way of a worm and a worm wheel. The worm wheel is molded from a synthetic resin material. The relative viscosity (VR) of the molded worm wheel is made greater than or equal to 100 and less than or equal to 300.

20 Claims, 3 Drawing Sheets

ELECTRIC POWER STEERING DEVICE

FIELD OF THE INVENTION

The present invention relates to an electric power steering device for transmitting the rotation of an electric actuator for generating auxiliary steering power to a vehicle wheel via a worm and a worm wheel.

DESCRIPTION OF THE RELATED ART

In light automobiles and small-sized automobiles, there is utilized an electric power steering device, which transmits the rotation of an electric actuator for generating auxiliary steering power to a vehicle wheel via a worm and a worm wheel, and endeavors are being made to lighten the weight and to reduce the noise of this electric power steering device by using a synthetic resin material to form the worm wheel.

Due to the demand in recent years for better fuel economy in order to tackle environmental problems, in an electric power steering device used in a large automobile as well, there has also been a call to form the worm wheel from a synthetic resin material. Thus, because the electric actuator should be made to produce higher output than that of a light automobile, there is a need to improve the dedendum strength, fatigue strength and backlash increase characteristics of the worm wheel, which reduces the speed of rotation of the electric actuator. The backlash increase characteristics correspond to the increment of backlash measured after rotations at a fixed number of times under the condition where the worm wheel meshes with a worm under a fixed load. The excessive backlash causes the noise at the point of contact between the worm wheel and worm to increase.

However, a conventional synthetic resin material worm wheel doesn't have sufficient dedendum strength, fatigue strength and backlash increase characteristics to be able to withstand a high output electric actuator.

An object of the present invention is to provide an electric power steering device that is capable of solving the above-mentioned problems.

SUMMARY OF THE INVENTION

The present invention is an electric power steering device for transmitting the rotation of an electric actuator for generating auxiliary steering power to a vehicle wheel via a worm and a worm wheel, which meshes with this worm, the worm wheel being characterized in that this worm wheel is molded from a synthetic resin material, and, according to a formic acid method, the relative viscosity (VR) of the molded worm wheel is greater than or equal to 100 and less than or equal to 300.

According to the present invention, it is possible to make the electric power steering device lighter weight and less noisy by molding the worm wheel, which transmits the rotation of the electric actuator, from a synthetic resin material. It is possible to improve the dedendum strength of the worm wheel by making the relative viscosity (VR) of the worm wheel molded from the synthetic resin material, measured using the formic acid method, greater than or equal to 100, and also, it is possible to ensure moldability by making the relative viscosity (VR) less than or equal to 300.

The present invention is based on the following knowledge.

In accordance with a general theoretical computation method applied to a gear fabricated from a metallic material, the dedendum strength of a gear is correlated to the tensile strength and the bending strength of the gear material. However, in the case of a worm wheel molded from a synthetic resin material, the dedendum strength is not correlated with the tensile strength and the bending strength of the material. In fact, in a case in which reinforcing fibers were filled into a synthetic resin material in order to improve the tensile strength and the bending strength, the dedendum strength was lower than in a case in which reinforcing fibers were not filled into the synthetic resin material. This is because the dedendum strength of a worm wheel formed from a synthetic resin material is determined in accordance with the balance between the buffering of the surface pressure acting on a tooth of the gear on the basis of the elasticity of the resin material and the strength of the synthetic resin material. The present invention was arrived at by newly discovering that dedendum strength can be improved by increasing the viscosity of the synthetic resin material. That is, in the present invention, the dedendum strength of the worm wheel was increased by making the value of the relative viscosity (VR) of the worm wheel molded from the synthetic resin material 100 or greater, which is larger than in the past, and in accordance therewith, fatigue strength and backlash increase characteristics are improved. Further, in the present invention, moldability can be ensured by making the relative viscosity (VR) of a worm wheel molded from the synthetic resin material 300 or less.

In the present invention, it is desirable that a worm wheel be formed via an injection molding process, and that the gate of the mold for the injection molding thereof is made a film gate. In accordance therewith, even if the relative viscosity of the synthetic resin material injected inside the cavity of the mold is large, it is possible to uniformly fill the inside of this cavity with synthetic resin material, and to prevent moldability degradation.

In the present invention, it is desirable that the synthetic resin material of the worm wheel is a nylon-based synthetic resin material. In a high viscosity nylon, the initial strength of the material itself, such as tensile strength and bending strength, is not different from that of a synthetic resin material of ordinary viscosity, but in a worm wheel molded from a high viscosity nylon, the dedendum strength increases, and performance does not drop in relation to the absorption of moisture and heat degradation even when viscosity increases. Further, a nylon-based synthetic resin material has excellent moldability, and, in addition, can be made long-life even when the relative viscosity is high.

In the present invention, it is desirable that the worm wheel is injection molded from a synthetic resin material. Injection molding can reduce molding costs.

In the present invention, it is desirable that the synthetic resin material of the worm wheel is a pure material. In accordance therewith, the wear of the worm, which meshes with this worm wheel, can be prevented.

In the present invention, reinforcing fibers can be filled into the synthetic resin material of the worm wheel. In accordance with filling reinforcing fibers, it is possible to enhance the dimensional stability of the synthetic resin material by preventing dimensional changes due to heat and moisture absorption.

According to the present invention, it is possible to provide an electric power steering device, which improves the strength of the synthetic resin material worm wheel for transmitting the rotation of the electric actuator for generating auxiliary steering power; makes it possible to increase the output of the electric actuator thereof; enables the

DESCRIPTION OF THE PREFERRED EMBODIMENT

Figure 1:
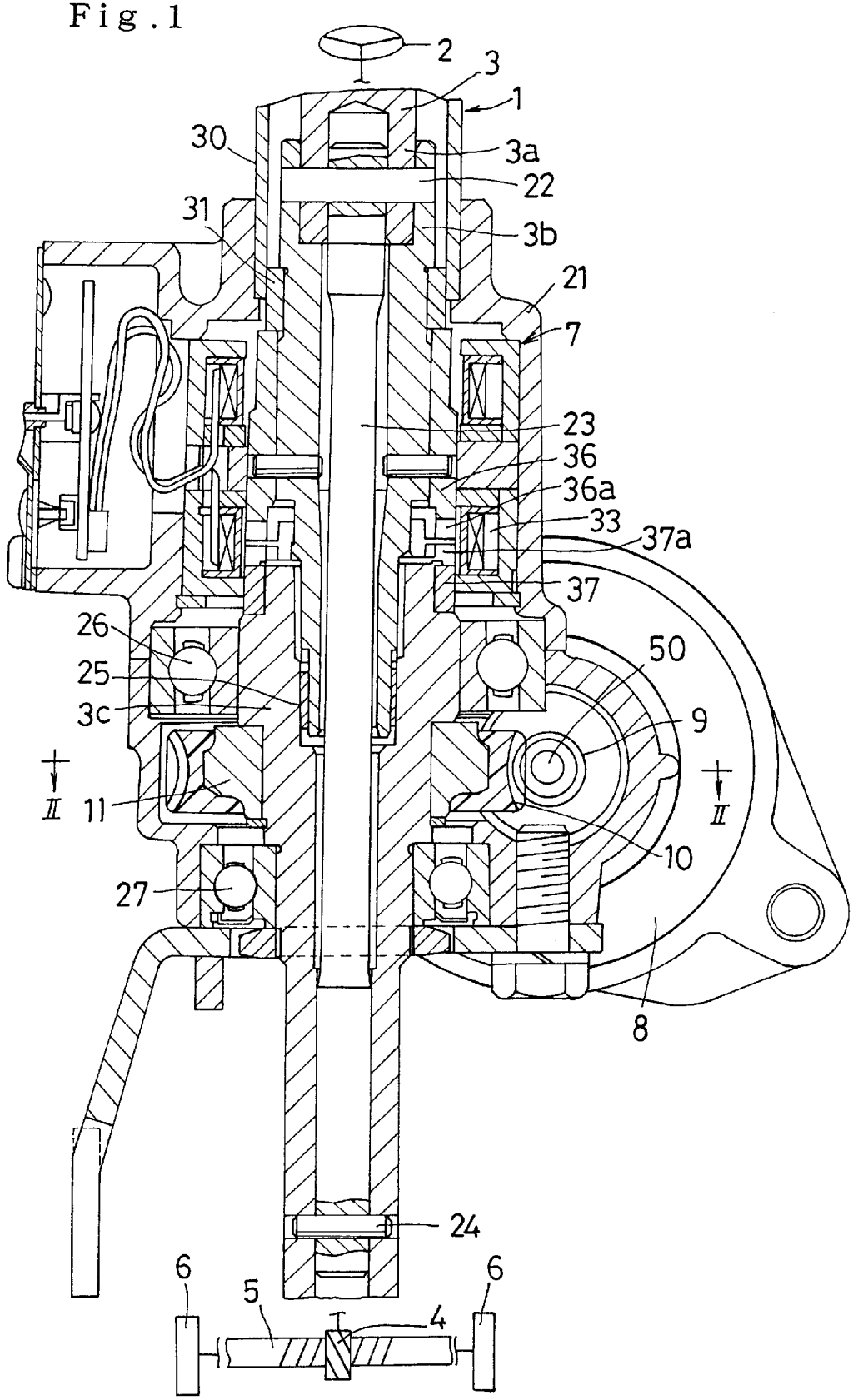
FIG. 1 is a cross-sectional view of an electric power steering device of an embodiment of the present invention.

The vehicle electric power steering device 1 shown in FIG. 1 transmits steering torque generated by the steering of a steering wheel 2 to a pinion 4 via a steering shaft 3, thereby causing the movement of a rack 5, which meshes with this pinion 4. The movement of this rack 5 is transmitted to wheels 6 of vehicle by way of tie rods, knuckle arms etc. (omitted from the figure), whereby the steering angle changes.

Figure 2:
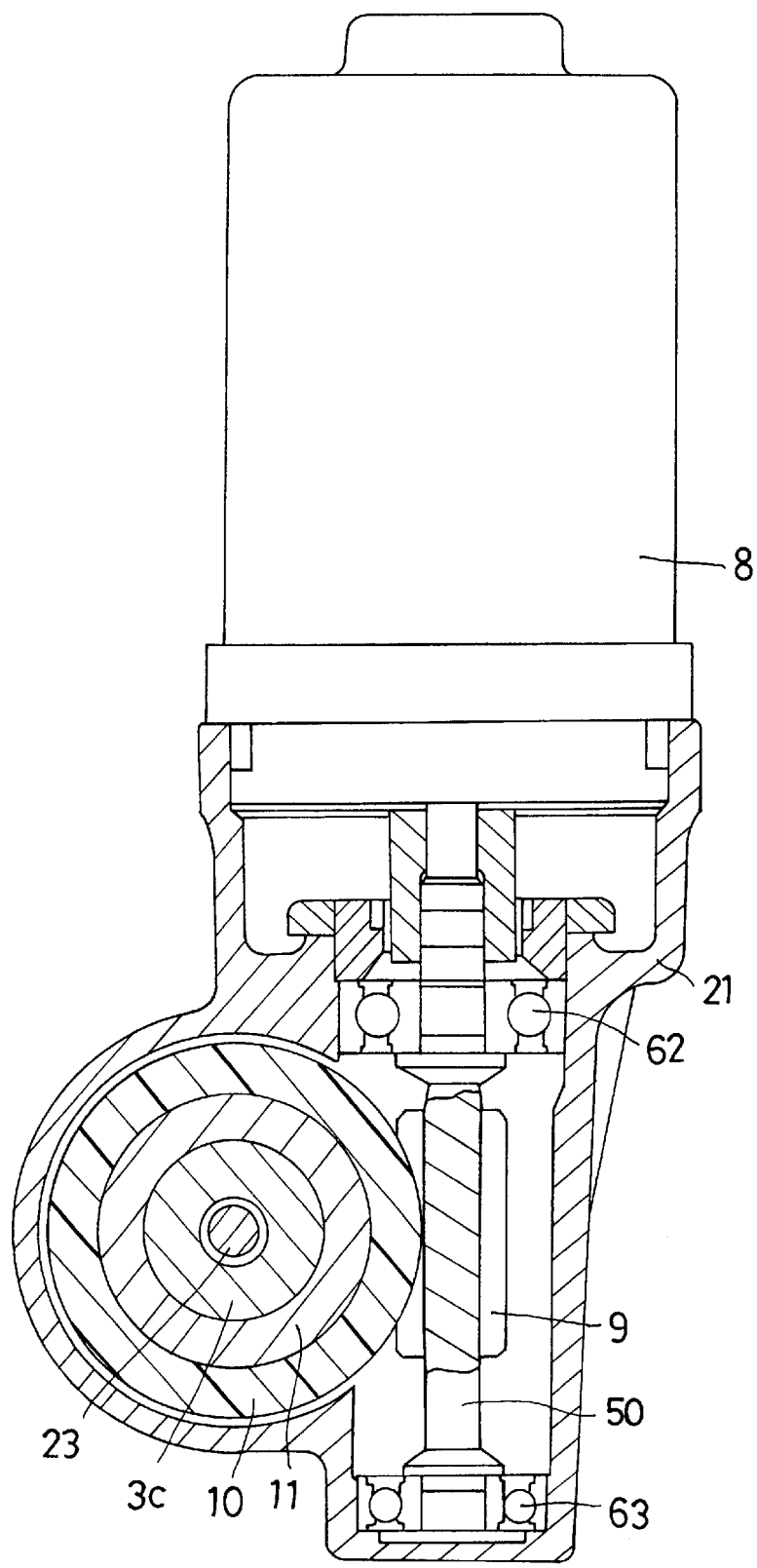
FIG. 2 is a cross-sectional view along line II—II of FIG. 1.

In order to furnish auxiliary steering power corresponding to the steering torque transferred by this steering shaft 3, there are provided a torque sensor 7 for detecting the steering torque, a motor (electric actuator) 8, which is driven in accordance with the detected steering torque, a metal worm 9, which is disposed on the periphery of a drive shaft 50 driven by the motor 8, and a worm wheel 10, which meshes with this worm 9, and is mounted to the steering shaft 3. Auxiliary steering power can be furnished by transmitting the rotation of the motor 8 to the wheels 6 from the steering shaft 3 via the worm 9 and the worm wheel 10. As shown in FIG. 2, the drive shaft 50, which is driven by the motor 8 mounted to a housing 21, is supported by the housing 21 via the bearings 62, 63.

The steering shaft 3 is divided into a first shaft 3a, which is connected to the steering wheel 2, a tubular second shaft 3b, which is connected by a pin 22 to the first shaft 3a, and a tubular third shaft 3c, which is fitted to the periphery of the second shaft 3b via a bushing 25 so as to be able to rotate relatively. A torsion bar 23 is inserted as an elastic member parallel to the center of each shaft 3a, 3b, 3c. One end of the torsion bar 23 is connected by the above-mentioned pin 22 to the first shaft 3a and the second shaft 3b, and the other end is connected to the third shaft 3c by a pin 24. Thus, the second shaft 3b and third shaft 3c are made elastically relatively rotatable in response to the steering torque.

The second shaft 3b is supported via a bushing 31 by a steering column 30 forced into the housing 21. The third shaft 3c is supported via bearings 26, 27 by the housing 21. The above-mentioned worm wheel 10 is integrated to the periphery of a metal sleeve 11 fitted to the periphery of the third shaft 3c. This sleeve 11 can either be forced to the third shaft 3c, or fixed thereto with using a key or the like. Further, a torque limiter mechanism can be disposed between the sleeve 11 and the third shaft 3c such that the worm wheel 10 and steering shaft 3 rotate relatively when excessive torque is applied.

The torque sensor 7 has a first detecting ring 36, which is made from a magnetic material and is affixed to the second shaft 3b, a second detecting ring 37, which is made from a magnetic material and is affixed to the third shaft 3c, and a detecting coil 33, which covers the space between the two opposing detecting rings 36, 37. The opposed surface areas of the plurality of teeth 36a disposed circumferentially on the end face of the first detecting ring 36 and the plurality of teeth 37a disposed circumferentially on the end face of the second detecting ring 37 change in accordance with the elastic relative rotation in response to the steering torque of the second shaft 3b and the third shaft 3c, and magnetic resistance relative to a magnetic flux generated by the detecting coil 33 changes in accordance with this change, thereby enabling steering torque to be detected on the basis of output of the detecting coil 33. This torque sensor 7 can be one that utilizes a known constitution. The above-mentioned motor 8 is driven in accordance with a signal in response to the detected steering torque thereof, and the rotation of this motor 8 is transferred to the steering shaft 3 by way of the worm 9 and worm wheel 10.

The worm wheel 10, which is the reduction gear for the rotation of this motor 8, is made from a synthetic resin material, and is formed by an injection molding process. The value of the relative viscosity (VR) of this molded worm wheel, which is measured using a formic acid method, is greater than or equal to 100 and less than or equal to 300. In this embodiment, the synthetic resin material is a nylon-based synthetic resin material, such as PA (polyamide)6, PA66, PA46, PA12, PA11, PPA (polyparabanic acid) 11, PA6T, or PA6.6T, and is a pure material, that is, into which no other materials have been filled.

Figure 3:
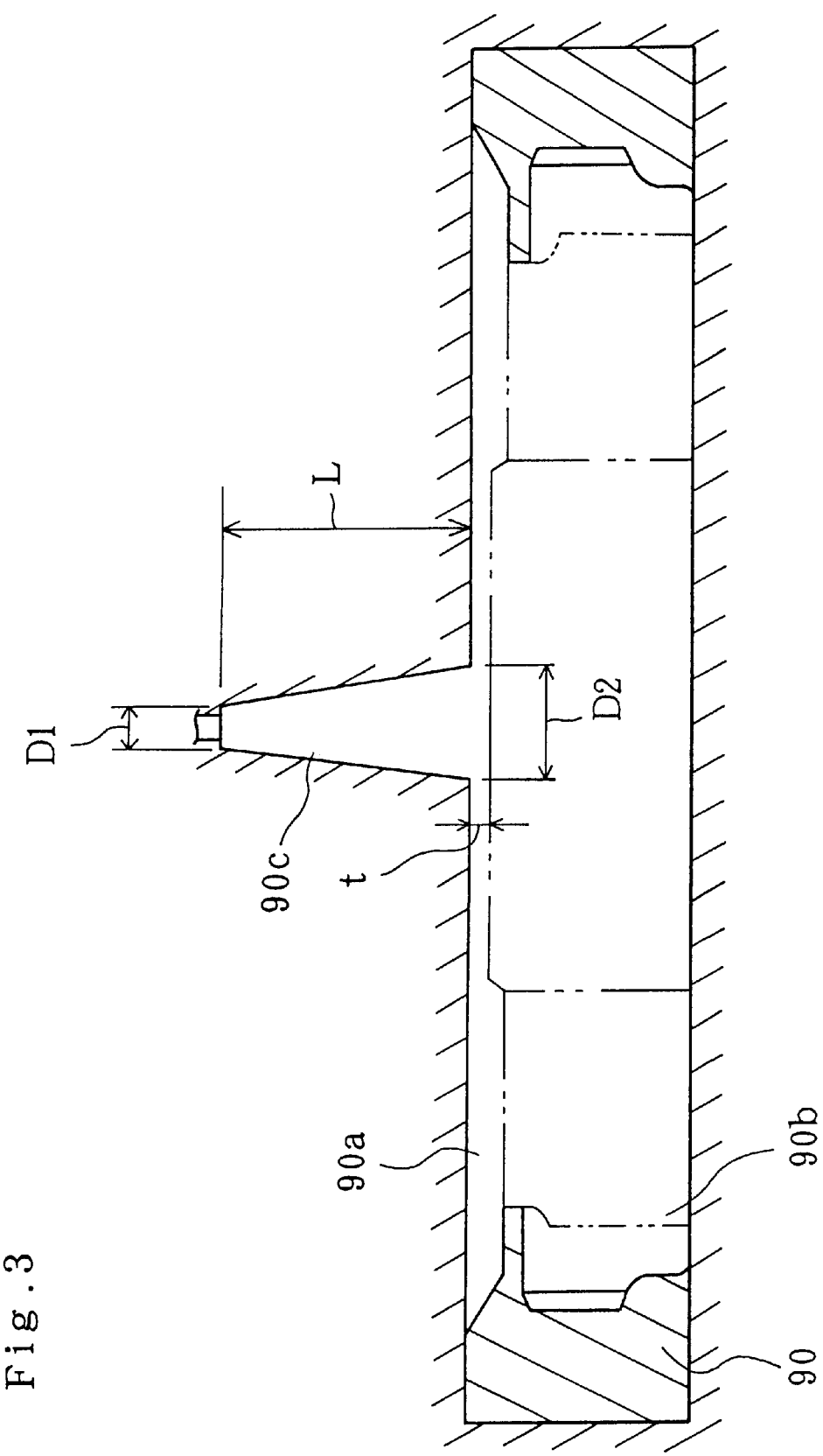
FIG. 3 is a schematic diagram of the constitution of a worm wheel mold of the embodiment of the present invention.

When the relative viscosity of the molded worm wheel 10 is larger, the viscosity of the synthetic resin material pellets, which constitute the raw material, also becomes larger. When this happens, because the viscosity of the solution of melted pellets increases when a worm wheel 10 is formed by injecting the solution inside the cavity of a mold, moldability deteriorates. Thus, in this embodiment, the gate 90a of the mold 90 for worm wheel 10 is a film gate as shown in FIG. 3. In accordance therewith, even if the relative viscosity is large, it is possible to uniformly fill the material inside the cavity 90b. Furthermore, it is desirable that the thickness of the gate 90a is made 2.5 mm or greater in order to uniformly fill the material inside the cavity 90b, and it is desirable that the length L of the runner 90c is as short as possible, but because the rigidity of the metal mold should be ensured, it is desirable that this length L is greater than or equal to 40 mm and less than or equal to 50 mm. It is desirable that the diameter D1 of the inlet of this runner 90c is made 4 mm or larger to reduce the flow resistance of the material, and, in addition, is made 6 mm or less to reduce resistance caused by the step between the inlet and the material injection nozzle (the diameter of which is ordinary 3 mm). The diameter D2 of the outlet of this runner 90c should be made 13 mm or larger to reduce the flow resistance of the material, and the maximum diameter can be equal to the diameter of the gate 90a.

In this embodiment, the worm wheel 10 is integrated with the above-mentioned sleeve 11 by performing injection molding in a state, wherein the sleeve 11 is inserted into the mold 90, and following this molding, the removal of the material filled into the gate 90a and runner 90c, and the finishing of the teeth of the worm wheel 10 are carried out by machining.

According to the above constitution, the electric power steering device can be made light weight and less noisy by molding the worm wheel 10, which transmits the rotation of the motor 8, from a synthetic resin material; worm wheel dedendum strength, fatigue strength and backlash increase characteristics can be improved by setting the relative viscosity (VR) of the molded worm wheel to 100 or more; and moldability can be ensured by setting the relative viscosity (VR) to 300 or less. Further, a worm wheel molded from a high-viscosity nylon has high dedendum strength, and even if viscosity increases, there is no reduction in performance in relation to moisture absorption and heat degradation. Molding costs can be reduced by injection molding the worm wheel 10 from a synthetic resin material. Because the synthetic resin material is a pure material, wear of worm 9 can be prevented.

The present invention is not limited to the embodiment described herein-above. For example, as the material of the worm wheel, a thermoplastic synthetic resin material other than nylon, such as PPS (polyphenylene sulfide), PES (polyether sulfone), or POM (polyacetal), can be utilized. Further, reinforcing fibers can be filled into the synthetic resin material, which is the worm wheel material. By the filling of reinforcing fibers, the dimensional stability of the synthetic resin material can be improved by preventing dimensional changes resulting from moisture absorption or heat. As the reinforcing fibers, it is desirable to use potassium titanate whiskers or aramid fibers from the standpoint of preventing the wear of the worm, which meshes with the worm wheel.

Worm wheels of the embodiment described herein-above were subjected to dedendum strength testing, fatigue strength testing, and durability testing. The worm wheels were injection molded from a pure material of PA66, and those worm wheels made with relative viscosities (VR) of 50, 90 were regarded as comparative examples "a", "b", and those made with relative viscosities (VR) of 140, 180, 200 were regarded as embodiments "c", "d", "e".

In the dedendum strength testing, torque was applied to the worm with the worm wheel in a locked state, and the torque applied to the worm at the time when the teeth of the worm wheel broke was measured as the dedendum strength of the worm wheel.

In the fatigue strength testing, in a state wherein a fixed load was applied from the vehicle wheel side, the steering wheel was rotated back and forth at a fixed angle of rotation, and the number of back-and-forth rotations at the time when the teeth of the worm wheel broke was measured.

In the durability testing, in a state wherein a fixed load was applied from the vehicle wheel side, the steering wheel was rotated back and forth at a fixed angle of rotation by a fixed number of times only, and the amount of backlash between the teeth of the worm wheel and the teeth of the worm was measured as a value corresponding to the amount of wear of the teeth of the worm wheel.

The results of each of the tests are shown in Table 1 herein-below. Furthermore, values for comparative example "a" are treated as 1, and each measured value is expressed as a ratio relative to the value of the comparative example "a".

TABLE 1

| | Comparative Example | | Embodiment | | |
|---|---|---|---|---|---|
| | "a" | "b" | "c" | "d" | "e" |
| Dedendum Strength | 1 | 1.73 | 2.09 | 2.73 | 3.00 |
| No. of Back-and-Forth Turns | 1 | 3.3 | 5.7 | 9.3 | More than 13.2 |

TABLE 1-continued

| | Comparative Example | | Embodiment | | |
|---|---|---|---|---|---|
| | "a" | "b" | "c" | "d" | "e" |
| Backlash Quantity | 1 | 0.9 | 0.72 | 0.51 | 0.2 |

From the embodiment described herein-above, it can be ascertained that, according to the present invention, it is possible to provide improved strength, longer life, and improved backlash increase characteristics in a synthetic resin worm wheel.

What is claimed is:

1. An electric power steering device for transmitting the rotation of an electric actuator for generating auxiliary steering power to a vehicle wheel, comprising:

a worm; and a worm wheel which meshes with said worm, said worm wheel being molded from a pure synthetic resin material and having a relative viscosity (VR) greater than or equal to 100 and less than or equal to 300, the relative viscosity being measured using a formic acid method.

2. The electric power steering device according to claim 1, wherein the synthetic resin material is a nylon-based synthetic resin material.

3. The electric power steering device according to claim 1, wherein said worm wheel is injection molded from the synthetic resin material.

4. The electric power steering device according to claim 1, wherein the relative viscosity is greater than or equal to 140 and less than or equal to 200.

5. The electric power steering device according to claim 1, wherein the synthetic resin material is a polyamide.

6. The electric power steering device according to claim 1, wherein the synthetic resin material is selected from a group consisting of PA6, PA66, PA46, PA12, PA11, PPA (polyparabanic acid), PA6T and PA6-6T.

7. The electric power steering device according to claim 1, wherein the synthetic resin material is a thermoplastic synthetic resin material.

8. The electric power steering device according to claim 1, wherein the synthetic resin material is selected from a group consisting of polyphenylene sulfide, polyether sulfone and polyacetal.

9. The electric power steering device according to claim 1, wherein the synthetic resin material has a relative viscosity of 140.

10. The electric power steering device according to claim 1, wherein the synthetic resin material has a relative viscosity of 180.

11. The electric power steering device according to claim 1, wherein the synthetic resin material has a relative viscosity of 200.

12. A method for manufacturing an injection-molded worm wheel for an electric power steering device, comprising the steps of:

molding a pure synthetic resin material to obtain a worm wheel; and processing the worm wheel to have a relative viscosity (VR) greater than or equal to 100 and less than or equal to 300, the relative viscosity being measured using a formic acid method.

13. The method according to claim 12, wherein the synthetic resin material is a nylon-based synthetic resin material.

14. The method according to claim 12, wherein the relative viscosity is greater than or equal to 140 and less than or equal to 200.

15. The method according to claim 12, wherein the synthetic resin material is a polyamide.

16. The method according to claim 12, wherein the synthetic resin material is a thermoplastic synthetic resin material.

17. The method according to claim 12 wherein the synthetic resin material is selected from a group consisting of polyphenylene sulfide, polyether sulfone and polyacetal.

18. The method according to claim 12, wherein the synthetic resin material has a relative viscosity of 140.

19. The method according to claim 12, wherein the synthetic resin material has a relative viscosity of 180.

20. The method according to claim 12, wherein the synthetic resin material has a relative viscosity of 200.

* * * * *